Feb. 7, 1950 R. C. RAYMOND 2,496,560
RADIO SPECTRUM MONITORING APPARATUS
Filed Nov. 27, 1945
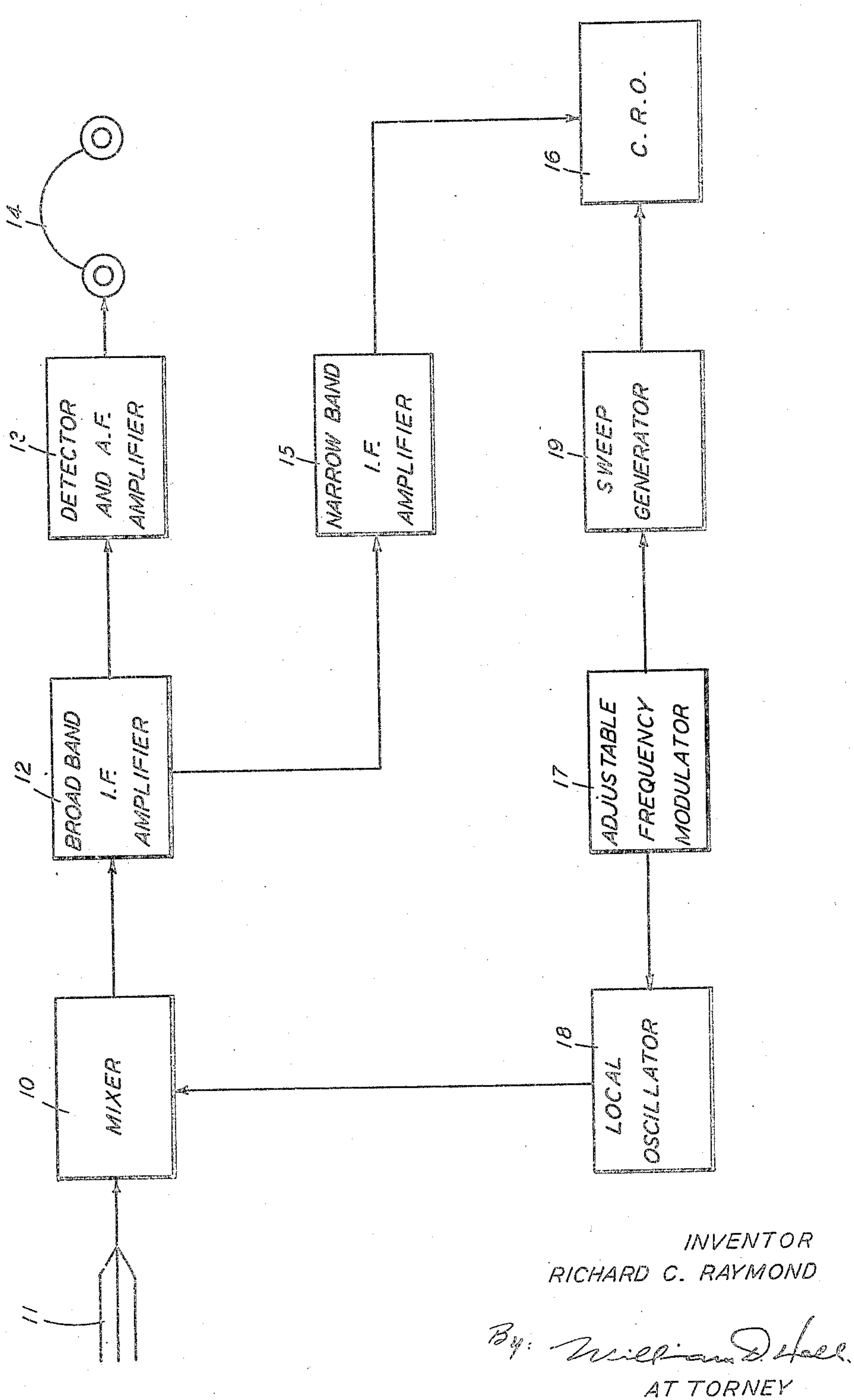
INVENTOR
RICHARD C. RAYMOND
By: William D. Hall
ATTORNEY Patented Feb. 7, 1950 2,496,560

UNITED STATES PATENT OFFICE 2,496,560

RADIO SPECTRUM MONITORING APPARATUS

Richard C. Raymond, State College, Pa., assignor to the United States of America as represented by the Secretary of War Application November 27, 1945, Serial No. 631,190

6 Claims. (Cl. 250—20)

This invention relates generally to electrical apparatus and more particularly to a radio frequency receiver.

In many cases, such as in the operation of networks controlled by a master transmitting station, it is desired to set a transmitter frequency exactly on that of another transmitter whose signal is received. The accuracy with which a local transmitter may thus be set on the frequency of a received signal by the use of an audio frequency indicator is dependent in part upon the modulation of the received signal. As the spectral distribution of energy broadens, aural setting becomes increasingly difficult and inaccuracy generally results. The spectral distribution of energy in a pulsed signal is so broad that in most cases it renders aural setting impractical and the transmitter can be set more nearly on the desired frequency when the spectrum of the received energy is presented on a visual indicator.

It is an object of this invention to provide a radio frequency receiver which will accurately determine the carrier frequency of a received signal.

It is also an object of this invention to provide a receiver for determining the spectral distribution of energy in a received signal.

It is another object of this invention to provide a receiver particularly adapted for the reception of pulsed signals and for the visual and aural presentation of these received signals.

It is a further object to provide a receiver by which local radio frequency transmitters can be monitored, by means of visual and aural indicators, to insure that local transmitters remain on the frequency of a selected received signal.

This invention is therefore designed to combine the properties of a broad-band search receiver, and a narrow band spectrum analyzer with visual presentation, in order that the spectrum of the received signal may be investigated and in order that the frequency of a local or other transmitter may be set in the center on any desired part of the spectrum.

A received signal is mixed with the frequency of the local receiver oscillator and the resulting frequencies are passed through a relatively broad-band intermediate-frequency amplifier. The output from this amplifier is divided, part of the energy is transferred to the detector and audio amplifier circuit and the remainder passes into a relatively narrow-band intermediate-frequency amplified, the frequencies passed by this amplifier are impressed on a cathode ray oscilloscope for visual presentation.

Other objects, features, and advantages of this invention will suggest themselves to those skilled in the art and will become apparent from the following description of the invention taken in connection with the accompanying drawing which is a block diagram of a receiver embodying the principles of the present invention.

Referring now to the drawing, it is seen that a mixer stage 10, has its input circuit connected to an antenna 11 and its output circuit connected to a broad-band intermediate frequency stage 12. Amplifier stage 12 feeds a signal to detector and audio-frequency amplifier stage 13 whose output operates an aural device such as headphones 14.

Amplifier 12 also feeds a signal to narrow-band intermediate frequency amplifier 15 whose output is presented on a cathode-ray-oscilloscope 16. An adjustable frequency-modulator 17 feeds a signal to local oscillator 18 whose output is fed to mixer stage 10. Adjustable frequency-modulator stage 17 also feeds a signal to a sweep circuit 19 which provides sweep voltages for cathode-ray-oscilloscope 16.

The device herein disclosed consists of a superheterodyne type receiver equipped with broad band circuits followed by an aural indicator for use as a search receiver. Narrow band circuits followed by a visual indicator are also included in the device for the purpose of accurately setting a locally transmitted frequency to that of the received signal.

As shown by the drawing the local oscillator 18 is frequency modulated. The frequency deviation is at a fixed suitable rate and the extent of the frequency deviation is adjustable. The sweep circuit 19 of the cathode-ray-oscilloscope is synchronized with the frequency excursions of the local oscillator 18. The pass-band of the narrow-band amplifier 15 is centered at a frequency in the lower part of the pass-band of the broad-band amplifier 12 in order that the dual signal detected by the receiver may be presented on the oscilloscope with minimum frequency deviation of the local oscillator; thus preventing ambiguity concerning the dual signal.

For example, assume the broad-band amplifier 12 to pass frequencies between 15 and 20 megacycles and the narrow-band amplifier 15 to pass frequencies between 15 and 16 megacycles. Suppose the received signal to be at a frequency of 560 megacycles, then a double signal would be visible on the oscilloscope when the local oscillator is tuned to a frequency of 575.5 megacycles and when tuned to a frequency of 544.5 megacycles.

Thus, by way of example, if the frequency deviation of the local oscillator 18 due to frequency modulation is 32 megacycles or more, it is possible to present two presentations of the signal on the oscilloscope screen simultaneously. Now if the frequency of a local or other transmitter is adjusted until its signal responses as shown on the oscilloscope are coincident with the similar responses from the received signal, frequency coincidence of the two signals will be achieved.

While there has been here described one embodiment of the present invention, it will be manifest to those skilled in the art that various changes and modifications may be made therein. It is therefore aimed in the appended claims to cover all such changes and modifications as fall within the true spirit and scope of the invention.

What is claimed is:

1. In a network adapted to translate waves of a given frequency, an oscillator, a mixer for heterodyning said wave with the output of said oscillator to derive difference-frequencies, a channel fixedly tuned in the region of a predetermined difference-frequency and coupled to the output of said mixer, means continuously and periodically varying the frequency of said oscillator over a range extending at least from the frequency of said waves minus the predetermined difference-frequency to the frequency of said waves plus the predetermined difference-frequency and signal indicating means coupled to the output of said channel.

2. A receiver for waves within a predetermined frequency region comprising an oscillator having a mean frequency which is substantially equal to the mean frequency of said region, a mixer for heterodyning said waves with the output of said oscillator to derive difference-frequencies, a fixedly-tuned intermediate-frequency channel sharply tuned to a predetermined difference-frequency and coupled to the output of said mixer, means to continuously frequency modulate said oscillator over a range equal to twice said predetermined difference-frequency, and indicating means coupled to the output of said channel.

3. In a search receiver adapted to indicate the frequency characteristic of waves within a predetermined frequency region, a local oscillator, a mixer for heterodyning said waves with the output of said oscillator, a fixedly-tuned channel coupled to the output of said mixer, means continuously frequency modulating said oscillator over such a range that a beat frequency within the pass band of said channel will be derived from a given incoming wave at two different frequency settings of said oscillator located on opposite sides of the mean frequency of said range, and means responsive to the output of said channel to provide a pair of indications dependent upon said two different frequency settings.

4. In a search receiver adapted to detect and indicate a frequency characteristic of waves within a predetermined frequency region, a local oscillator, a mixer for heterodyning said waves with the output of said oscillator to derive a difference-frequency wave, a pair of tuned channels coupled to the output of said mixer, one channel having a pass band which is wider than that of the other channel and having means for audibly translating the modulation component of a wave therein, the center frequency of said other channel being displaced from the center frequency of said one channel but within the pass band thereof, means to vary the frequency of said oscillator over a range equal to at least twice the center frequency of said other channel whereby a beat frequency within the pass band of said other channel will be derived from a given incoming wave at two different frequency settings of said oscillator, and means responsive to the output of said other channel to provide a pair of spaced visual indications dependent upon said two different settings.

5. In a radio search receiver adapted to translate the modulation component and indicate a frequency characteristic of waves within a predetermined frequency region, a local oscillator, a mixer for heterodyning said waves with the output of said oscillator to derive a difference-frequency wave, a pair of tuned channels coupled to the output of said mixer, one channel having a pass band which is wider than that of the other channel and having means therein for audibly translating the modulation component of a wave, the center frequency of said other channel being displaced from the center frequency of said one channel but within the pass band thereof, means to modulate the frequency of said oscillator over such a range that a beat frequency within the pass band of said other channel will be derived from a given incoming wave at two different frequencies of said oscillator, a cathode ray oscilloscope, means responsive to the output of said other channel to deflect the beam of said oscilloscope along one coordinate, and means to deflect the beam of said oscilloscope along a second coordinate in synchronism with modulation of said oscillator, whereby two indications spaced by an amount proportional to two frequencies will be provided by said incoming wave.

6. In a receiver as set forth in claim 5, wherein the pass band of said other channel is in the vicinity of the lower frequency limit of said one channel.

RICHARD C. RAYMOND.

REFERENCES CITED

The following references are of record in the file of this patent:

UNITED STATES PATENTS

| Number | Name | Date |
|---|---|---|
| 2,099,156 | Wheeler | Nov. 16, 1937 |
| 2,387,685 | Sanders | Oct. 23, 1945 |

FOREIGN PATENTS

| Number | Country | Date |
|---|---|---|
| 101,039 | Australia | May 11, 1937 |

OTHER REFERENCES

Radio, March 12, 1942, pp. 15–18, 46–49, by J. R. Popkin-Clurman, "Panoramic Radio Reception."

Electronic Industries, July 1944, pp. 86, 87, 88, 106, Article, "Panoramic Principles," by Moulic.